E. OLIVER.
DEMOUNTABLE RIM.
APPLICATION FILED JULY 8, 1916.
1,227,925.
Patented May 29, 1917.
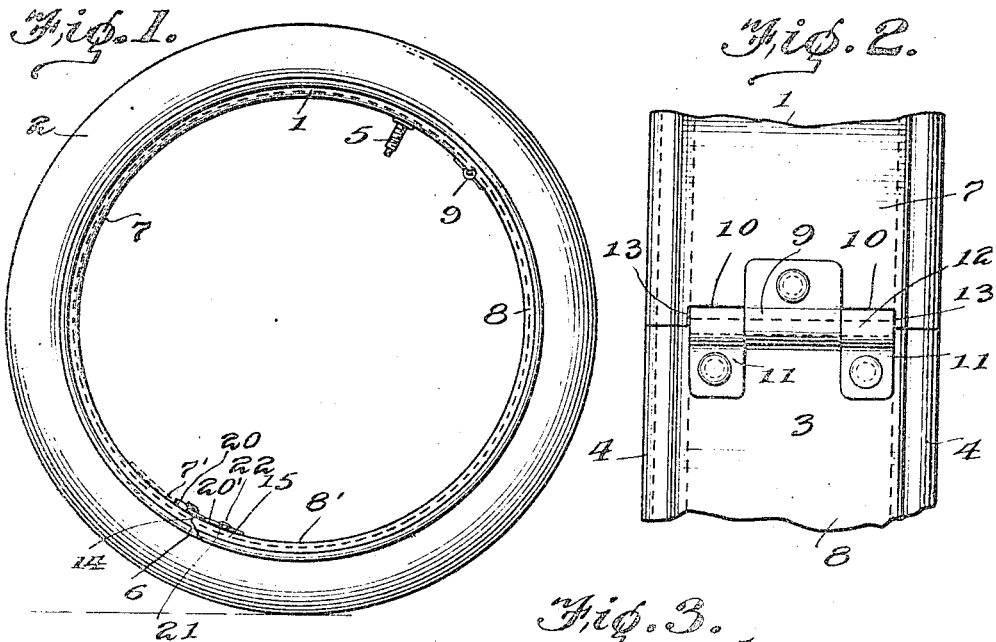
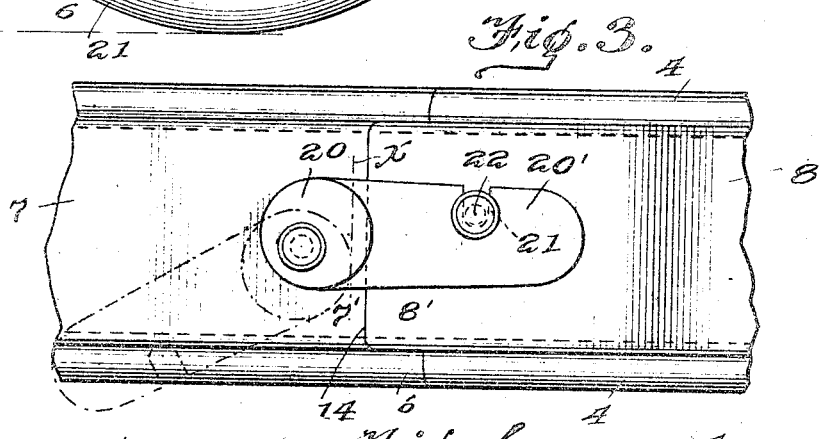
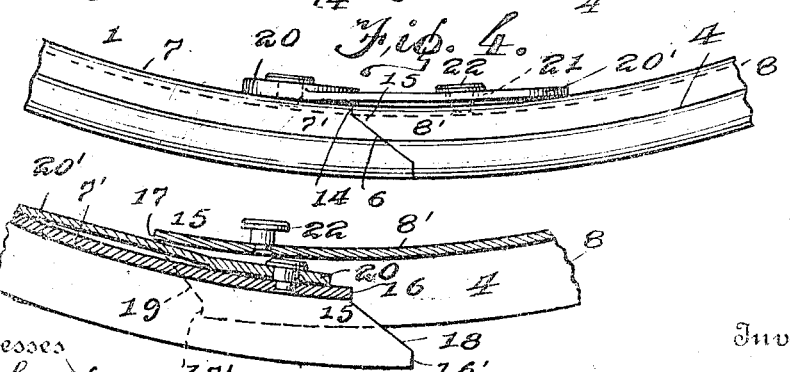
Witnesses
A. H. Lybrand
C. C. Hines
Inventor
Elmer Oliver
Attorneys

UNITED STATES PATENT OFFICE.

ELMER OLIVER, OF DAYTONA, FLORIDA.

DEMOUNTABLE RIM.

1,227,925.　　　　Specification of Letters Patent.　　Patented May 29, 1917.

Application filed July 8, 1916. Serial No. 108,095.

*To all whom it may concern:*

Be it known that I, ELMER OLIVER, a citizen of the United States, residing at Daytona, in the county of Volusia and State of Florida, have invented certain new and useful Improvements in Demountable Rims, of which the following is a specification, reference being had therein to the accompanying drawing.

This invention relates to improvements in demountable rims for automobile wheels, the primary object of the invention being to provide a split demountable rim embodying novel and improved means for connecting the rim ends together and admitting of their relative movements, whereby the operations of contracting and expanding the rim for the removal and retention of the tire will be simplified and expedited and the amount of time and manual labor required reduced to the minimum.

A further object of the invention is to provide a construction of two-part rim whereby permanent deformation of the rim will be prevented, whereby the free ends of the rim are adapted to be more readily and conveniently separated and brought together, and whereby the rim ends may be held firmly and securely against relative displacement.

The invention consists in the features of construction and the combination and arrangement of parts which will be hereinafter described, defined in the appended claims and illustrated in the accompanying drawings, in which:

Figure 1 is a side elevation of a demountable rim embodying my invention, showing the rim expanded and locked and having a tire mounted thereon;

Fig. 2 is a plan or inside view of the hinged edges of the rim on an enlarged scale;

Fig. 3 is a similar view of the free ends of the rim, showing in full and dotted lines the locking and releasing positions of the cam lever;

Fig. 4 is a side elevation of the portion of the rim shown in Fig. 3 on an enlarged scale;

Fig. 5 is a longitudinal section through the free ends of the rim and showing the joint broken and the ends lapped for a rim contracting action.

Referring to the drawing, 1 designates a demountable rim which is shown in Fig. 1 as having a pneumatic tire 2 mounted thereon, said rim consisting of a body portion 3 having the clencher or retaining flanges 4, the rim being provided, as usual, with an opening for the inward extension of the filling tube 5 of the tire.

In accordance with my invention, the rim 1, which is transversely split in the usual manner at one side thereof, as indicated at 6, is formed of two sections 7 and 8, having free end portions 7' and 8', respectively, said sections being united at one end by a hinge joint 9. In the formation of this hinge joint, which is located adjacent to but at one side of a point diametrically opposite the split 6, the hinging end of one of the sections is cut away to provide a central portion folded back and properly formed and riveted to provide a central knuckle 9' and opposite side recesses 10, while the hinging end of the other rim section 8 is cut away and similarly formed to provide side knuckles 11 receiving between them the central knuckle 9', the aforesaid knuckles being united by a pintle pin 12. The side knuckles 11 project and work within the recesses 10 and abut against the lateral shoulders 13 formed by the inner edges of the flanges 13 at the outer sides of said recesses, whereby a strong and durable type of hinge construction is provided which lies flush with the base of the shallow channel on the inner surface of the rim formed by the flanges and holds the hinged ends of the rim securely against lateral displacement under any of the stresses or strains to which it may be subjected in use.

The hinge connection 9 adapts the rim to be contracted and expanded with facility, it being understood that such contraction and expansion is secured by causing the free ends 14 and 15 of the rim to overlap, as shown in Fig. 5, and by bringing them together as shown in Figs. 1, 3 and 4. When contracted, the rim permits of the ready removal or application of the tire, and when expanded to its full extent the rim engages and holds the tire firmly and securely against displacement. In order to secure increased freedom of action in effecting the separation and connection of the rim ends 14 and 15, such ends of the rim are provided with straight or square abutment edges 16 and 17 across the rim body 3 and with flange terminals having beveled lapping surfaces 18 and 19 and square or straight abutment shoulders 18' and 19', said abutment shoulders 16, 17, 18' and 19' being adapted to squarely abut and the beveled or inclined edges 18 and 19 to overlap when the rim ends are brought together, by means of which the ends are coupled to maintain the rim securely in expanded condition.

It has been customary in some types of rims to have both the body portions and the flanges of the rim ends beveled or sloped continuously, but this is objectionable on account of the tendency of the sloping or inclined rim ends riding upon one another and creeping or crawling, thus tending to permit the rim to break joint and contract at the split portions under pressures and strains imposed thereon. The usual object in so beveling the meeting ends of the rim is to facilitate the operation of bringing such rim ends together. I overcome the aforesaid objection while retaining the above stated advantage by providing the square abutment surfaces 16, 17, 18' and 19' which prevent the creeping or crawling action referred to, and by making the ends of the flanges with beveled surfaces, by which the sliding engagement of the rim ends into abutting relation in the operation of expanding the wheel is effected in a reliable and efficient manner.

In the present instance I have shown the split portion 6 of the rim disposed opposite the perforated portion of the rim through which the filling tube 6 of the tire projects, this arrangement being deemed advisable in order to relieve the perforated portion of the rim from the stresses and strains incident to expansion and contraction except to a very minimum extent, while providing also for certain manipulations of the rim in contracting and expanding operations, as hereinafter described. It will be observed that the hinge joint 9 is disposed at a point which is eccentric to the position of the split 6, or, in other words, not on a line diametrically opposite the split, so that the two rim sections 7 and 8 are made to extend on arcs of different degrees, one being of somewhat greater circumferential length than the other. By this construction the portion of the rim directly opposite the split portion is prevented from bending, buckling or becoming deformed by the movements of the free ends in the expanding and contracting operations, and easier and freer relative movements of the rim ends are also obtained without the necessity of providing more than a single hinge joint, and hence without weakening the wheel rim or providing additional joints or surfaces which are liable to wear and tear and to cause trouble or annoyance as well as the possibility of accidents. By thus disposing the split and hinging portions they are also so relatively arranged as to be engaged by the wedges or fastening devices of the wheel rim proper, whereby such portions will be firmly braced when applied to the wheel.

By the construction and arrangement described the split joint 6, when released or unfastened for disconnection, may be spread by disposing the split portion of the rim downward and bringing the portion of the tire beneath the end 8' of the short rim section 8 into contact with the floor or ground with a little degree of force, whereby the end 8' will be forced up out of engagement with the end 7' so that the rim will be contracted automatically under the resiliency of the rim and tire to the position shown in Fig. 5, in which position the tire 2 may be easily and conveniently applied or removed. Such construction also allows of the ready and convenient expansion of the rim again to clamp the tire in position by pressure of the foot of the operator upon the end 8, the hinge joint 9 allowing the ends 7' and 8' to spread apart under the depression of the underlying portion of the tire so that such ends of the rim will be moved to a joint closing action, thus entirely obviating the necessity of using complex or auxiliary appliances for adjusting the ends of the rim into and out of joint closing engagement.

For the purpose, however, of bringing the abutment edges 16 and 17 of the rim ends 7' and 8' squarely together in the event that they should not squarely meet, I provide upon the rim end 7' a pivotally mounted cam or eccentric disk 19, the peripheral edge portion of which is so arranged as to be brought into engagement with the surface 17 of the end portion 8' to effect the spreading of the rim under the leverage thus introduced to a sufficiently greater extent to bring the shoulders 16 and 17 squarely into engagement. This cam or eccentric is provided with an operating handle or lever 20 in the form of a plate whereby it may be conveniently manipulated, and this lever is preferably formed in one of its side edges with a notch or recess 21 to engage a headed pin or stud 22 on the end portion 8', by means of which the cam may be locked in thrown position and brought with the lever to overlie the split portion of the tire, thus firmly holding the ends 7' and 8' against casual disconnection. It will be understood of course that preliminarily to contracting the rim the lever is shifted to the dotted line position shown in Fig. 3, whereby the free ends of the rim will be released for an opening and contracting movement.

From the foregoing description, taken in connection with the drawing, the construction of my improved demountable rim will be readily understood, and it will be seen that by reason of such construction a rim of a very simple type, free from complicated parts or attachments of any kind, is provided, and one which, while strong and durable, will permit of the split joint being broken and closed for the contraction and expansion of the rim without the use of tools and in a ready, easy and convenient manner. Time and labor in changing tires will thus be reduced to the minimum, a feature of great desirability and importance in devices of this kind.

While the structure disclosed is preferred, it will, of course, be understood that changes in the form, construction and arrangement of parts within the scope of the invention as defined in the appended claims may be made, without departing from the spirit or sacrificing any of the advantages thereof.

Having thus described my invention, I claim:

1. A demountable rim for pneumatic tires comprising a split rim body having end portions provided with abutting surfaces, and a cam or eccentric disposed upon the inner surface of one of the abutting ends operative for direct impingement against the other abutting end to spread said abutting ends into abutting engagement.

2. A demountable rim for pneumatic tires comprising a split rim body having end portions provided with abutting surfaces, a cam or eccentric disposed upon the inner surface of one of the abutting ends operable for engagement with the other abutting end to spread said abutting ends into engagement, and a lever for operating said cam or eccentric and adapted to overlap the latter named end of the rim when in thrown position.

3. A demountable rim for pneumatic tires comprising a rim body formed of two unequal sections, said sections being hinged at two of their ends and having abutting surfaces at their opposite ends, and a cam or eccentric disposed upon the inner surface of one of the abutting ends and operative for direct impingement against the end edge of the other abutting end to spread said abutting ends into abutting engagement.

4. A demountable rim for pneumatic tires comprising a rim body formed of two unequal sections, said sections being hinged at two of their ends and having abutting surfaces at their opposite ends, a cam or eccentric on one of the abutting ends operable for engagement with the other abutting end to spread said abutting ends into engagement, and a lever for operating said cam or eccentric and adapted to overlap the latter named end of the rim when in thrown position.

5. A demountable rim for pneumatic tires comprising a rim body formed of two unequal sections, said sections being hinged at two of their ends and having abutting surfaces at their opposite ends, a cam or eccentric on one of the abutting ends operable for engagement with the other abutting end to spread said abutting ends into engagement, a lever for operating said cam or eccentric, and means on the latter named abutting end of the rim for locking engagement with said lever.

6. A demountable rim for pneumatic tires comprising a split rim body having end portions provided with abutting surfaces, a cam or eccentric on one of the abutting ends operable for engagement with the other abutting end to spread said abutting ends into engagement, a lever for operating said cam or eccentric, and means on the latter named abutting end of the rim for locking engagement with said lever.

7. A demountable rim for pneumatic tires comprising a split rim member having abutting ends, the body portions and flanges of said abutting ends being provided with straight transverse abutment surfaces and reversely inclined lapping surfaces, a cam or eccentric on one of the abutting ends of the rim adapted for engagement with the other abutting end of the rim to spread said ends into abutting and lapping engagement, and a lever for actuating said cam or eccentric.

8. A demountable rim for pneumatic tires comprising a rim member formed of two unequal sections hinged at two of their ends and having their body portions and flanges respectively provided at their opposite ends with straight transverse abutment surfaces and reversely inclined lapping surfaces, a cam or eccentric on one of the latter named ends for engagement with the other of said ends to spread said ends into abutting and lapping engagement, and a lever for operating said cam or eccentric and adapted to overlap the latter named end of the rim when in thrown position.

9. A demountable rim for pneumatic tires comprising a rim member formed of two unequal sections hinged at two of their ends and having their body portions and flanges respectively provided at their opposite ends with straight transverse abutment surfaces and reversely inclined lapping surfaces, a cam or eccentric on one of the latter named ends for engagement with the other of said ends to spread said ends into abutting and lapping engagement, and a lever for actuating said cam or eccentric.

10. A demountable rim for pneumatic tires comprising a split rim member provided with abutting ends having their body portions and flanges provided with straight transverse abutting surfaces and reversely inclined abutment surfaces, a cam or eccentric on one of the abutting ends of the rim for engagement with the other abutting end of the rim to spread said ends into abutting and lapping engagement, a lever for actuating said cam or eccentric and adapted to overlap the latter named abutting end of the rim when in thrown position, and means on the latter named abutting end of the rim for locking engagement with said lever.

In testimony whereof I hereunto affix my signature in the presence of two witnesses.

ELMER OLIVER.

Witnesses:
F. W. POPE,
W. H. BRACEY.